United States Patent [19]

Boudouris

[11] 4,022,525
[45] May 10, 1977

[54] INTERMITTENT FILM DRIVE FOR MOTION PICTURE PROJECTOR

[75] Inventor: Angelo Boudouris, Sylvania, Ohio

[73] Assignee: Eprad Incorporated, Toledo, Ohio

[22] Filed: Sept. 29, 1975

[21] Appl. No.: 617,519

[52] U.S. Cl. .............................. 352/187; 352/160; 352/173; 352/180

[51] Int. Cl.² .................................. G03B 1/24

[58] Field of Search .......... 352/187, 166, 160, 164, 352/180, 173

[56] References Cited

UNITED STATES PATENTS

| | | | |
|---|---|---|---|
| 3,248,029 | 4/1966 | Money | 352/180 |
| 3,819,258 | 6/1974 | Butler | 352/166 |

*Primary Examiner*—Monroe H. Hayes
*Attorney, Agent, or Firm*—Oliver E. Todd, Jr.

[57] ABSTRACT

A motion picture projector having an improved electric transport system for incrementally advancing film through a light gate. A constant, but adjustable, velocity rotating shutter periodically interrupts the projected picture to permit advancing the film through the light gate to the next frame. As the shutter moves to a position blocking the projected picture, a shutter position detector generates a signal for triggering a control circuit which drives an electric servomotor to rotate a film drive sprocket. The servomotor is driven to rotate the sprocket to advance the film one frame and then to hold the sprocket in a fixed position to prevent any motion of the film while the picture is projected. Power is applied from a non-linear control circuit to the servomotor. Error signals applied to the servomotor are of a peak magnitude when the servomotor is stopped with the film framed in the light gate so that small position errors drive the servomotor to the desired position with a maximum torque. The servomotor may be run continuously or intermittently in a reverse direction for rewinding the film back through the projector at a constant high speed.

7 Claims, 5 Drawing Figures

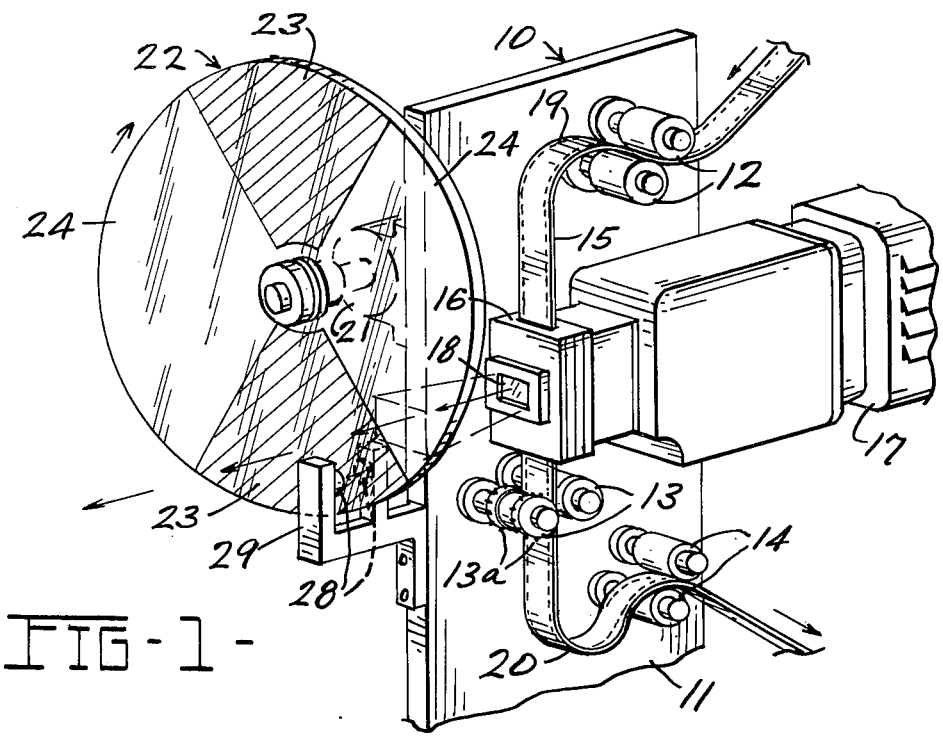
FIG-1-
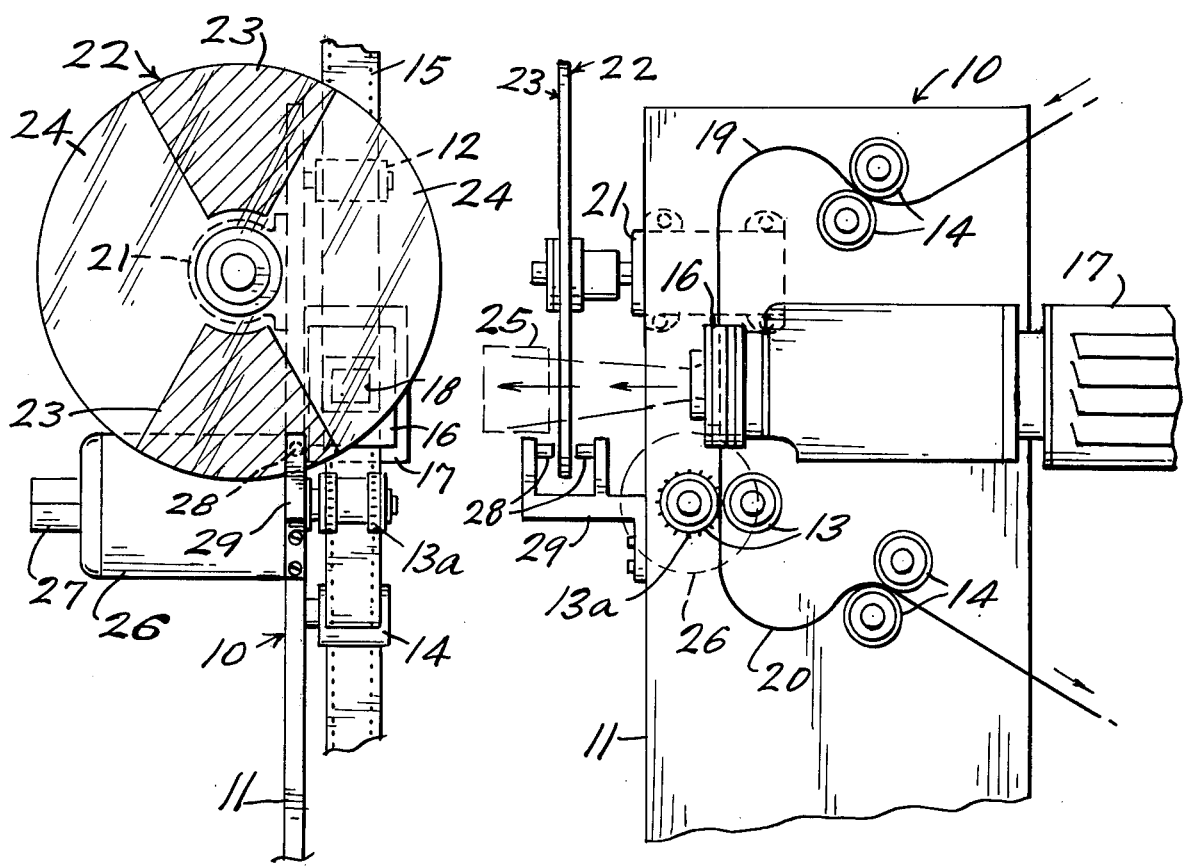
FIG-2- FIG-3-

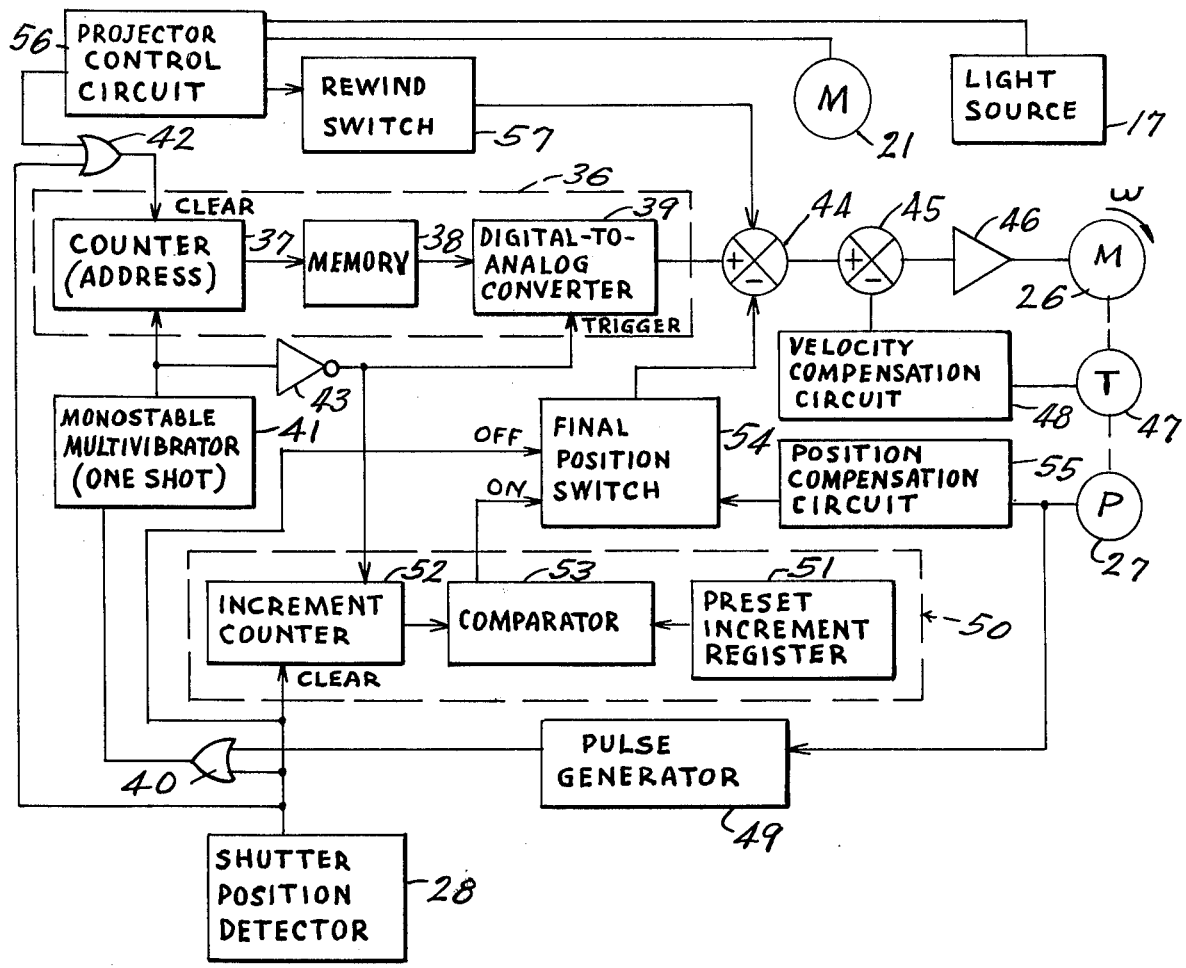
FIG-4-

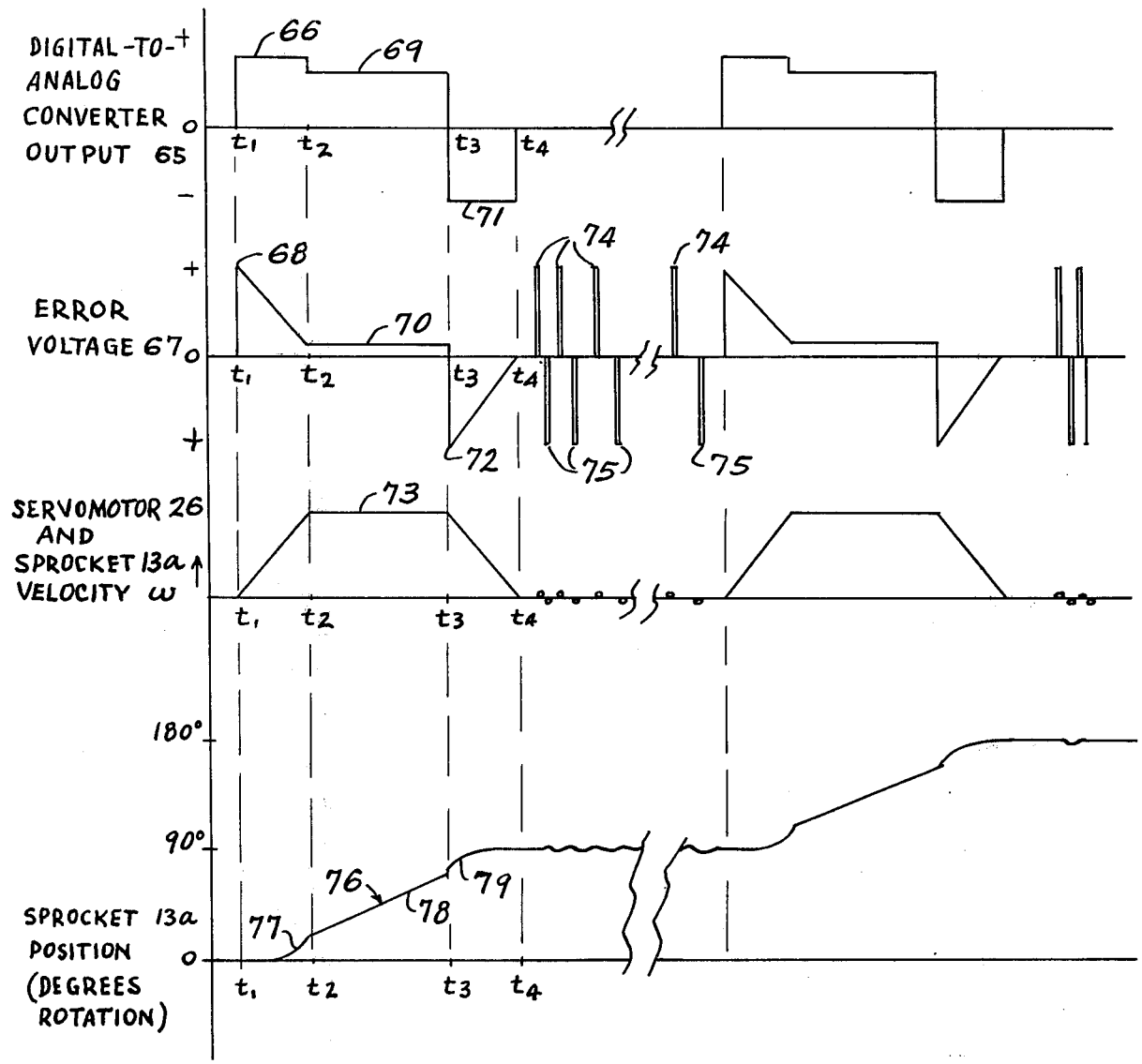
FIG-5-

INTERMITTENT FILM DRIVE FOR MOTION PICTURE PROJECTOR

BACKGROUND OF THE INVENTION

This invention relates to motion picture projectors and more particularly to an improved electric transport system for incrementally advancing film through a light gate in a motion picture projector.

Film projectors of a type commonly used in motion picture theaters typically comprise a high intensity light source, film supply and take-up reels and a drive system therefor, and a projection head including a light gate through which the film passes, a transport for incrementally advancing the film through the gate one frame at a time, a shutter and a lens system. The transport in the projection head often includes a single motor which drives both the shutter and a Geneva mechanism which periodically rotates a sprocket through a predetermined increment to advance the film through the gate. The Geneva mechanism is synchronized with the shutter through a gear drive such that the sprocket is rotated by an amount necessary to advance the film through the gate by one frame each time the shutter interrupts the projected picture. While a picture is projected, the Geneva mechanism inhibits movement of the sprocket to prevent any movement of the film in the gate.

Geneva mechanisms of a precision necessary for commercial motion picture projectors are quite expensive because of tight tolerance requirements. The mechanism must accurately advance the film in the gate to maintain a constant film alignment in the gate for each successive frame. If there is any variation in the alignment of successive frames in the light gate, the projected image will jump or jitter. When the image is projected on a large screen, such jitter is extremely annoying to the viewers and particularly to viewers nearest the screen. A Geneva mechanism has other disadvantages in addition to cost. A Geneva mechanism rotates the sprocket through predetermined fixed increments. Therefore, a projector must be designed for a specific film frame format and is not readily adaptable to other formats without replacing either the Geneva mechanism or the film sprocket, or both.

One solution to the problem of advancing different films by different increments for different frame sizes is suggested in U.S. Pat. No. 3,565,521 which issued Feb. 23, 1971 to Buttler et al. This patent suggests incrementally driving a servomotor to advance film through a light gate. The width of drive pulses to the servomotor may be changed for accommodating different picture frame sizes. The servomotor is stopped in response to a signal from an optical sensor detecting a hole in a positioning disc which is rotated with a sprocket which advances the film. However it is possible for forces such as film tension to rotate the sprocket by a small amount in either direction from the position at which it is stopped. This looseness of the film advance sprocket may cause considerable jumping in the projected picture since any small movement or misalignment of the film in the light gate is greatly magnified as the projected picture is enlarged.

It has recently been desirable to automate motion picture theaters. Along these lines, some modern projectors have been designed to hold an entire show. By using two projectors, one projector can be controlled to automatically rewind the film from the take-up reel back through the projection head to the supply reel while the other projector is running with a second show. Ideally, the rewinding is at a much faster rate than the normal operating speed of the projector so that rewinding is completed before the second show is finished, even where the second show is shorter than the first show. However, a Geneva mechanism limits the rate at which the film can be rewound through the projection head since the Geneva mechanism intermittently moves the film when driven in a reverse direction as well as in the forward direction.

SUMMARY OF THE INVENTION

According to the present invention, an improved transport system is provided for incrementally advancing film through a light gate in a motion picture projector and also for continuously rewinding the film back through the projector. The film is incrementally advanced through the projector by a servomotor system which is controlled in response to the position of a shutter. The shutter position is detected, for example, by a proximity switch, a capacitive switch or an optical detector. The servomotor is driven to advance the film through a light gate by one frame when the shutter is detected in a position blocking the projected picture. A signal generated in response to the position of the shutter is used for starting a control circuit which generates an analog voltage for driving a servomotor through a predetermined velocity profile. The servomotor directly drives a sprocket which advances the film through the light gate. The velocity profile may, for example, be in the form of a trapezoid or generally in the form of half a cycle of sine wave. In a preferred embodiment, the velocity profile is stored in a memory. A counter is incremented by a clock for sequentially addressing the memory to produce the stored profile. Framing adjustments are readily made by modifying the count stored in the counter. Unlike the prior art, no mechanical rotation of the detector assembly is necessary for framing. The servomotor is driven as a velocity controlled servo system while the film is advanced. When the servomotor reaches the desired final position with the film frame aligned in the light gate, control of the servomotor is switched to a position controlled servo system. If any positive or negative deviation from the desired film position occurs, as due to film tension, a full amplitude error signal is applied to the servomotor to drive the servomotor back to the desired position. Thus, the servo position control system provides maximum gain for holding or returning the servomotor to the desired stopped position rather than a control signal which varies in magnitude with the magnitude of the position error. This arrangement prevents any noticeable movement of the stopped film in the light gate and the resultant jump or jitter in the projected picture.

When the projector is used in an automated theater, it may be desired to automatically rewind the film bck through the projector. At the end of the film, a mark on the film, such as a metallic foil strip adhered to the film, is automatically sensed by a "pick-off" device in a conventional manner. When the mark is sensed, the light source to the projector is turned off and a second projector is automatically turned on to show either the next segment of the film currently being shown or to show a second film. At the same time, the first projector is automatically switched to a rewind mode. In the rewind mode, the servomotor is continuously energized in a reverse direction to move the film in a reverse direction through the projector from the take-up reel to the supply reel. The servomotor may be driven at a continuous velocity for rewinding the film at an appreciably faster rate than it was originally advanced through the projector. When the film is completely rewound on the supply reel, a conventional control circuit senses a mark on the film, such as a piece of foil adhered to the film, and stops the servomotor. At this time, the projector is set for reshowing the picture when the second projector finishes with the picture which is currently being shown.

Accordingly, it is an object of the invention to provide an improved transport system for moving motion picture film through a light gate in a motion picture projector.

Another object of the invention is to provide an improved control system for driving a servomotor which incrementally advances motion picture film through a light gate in a motion picture projector.

Other objects and advantages of the invention will become apparent from the following detailed description, with reference being made to the accompanying drawings.

BRIEF DESCRIPTION OF THE DRAWINGS

FIG. 1 is a fragmentary perspective view of a portion of a projection head for a motion picture projector which is exemplary of the present invention;

FIG. 2 is a fragmentary front elevational view of the exemplary projection head of FIG. 1;

FIG. 3 is a fragmentary side elevational view of the exemplary projection head of FIG. 1;

FIG. 4 is a detailed block diagram of a servomotor control circuit for a film transport in a motion picture projection head constructed in accordance with the present invention; and FIG. 5 is a graph showing the operational sequence of the servomotor control circuit of FIG. 4.

DESCRIPTION OF THE PREFERRED EMBODIMENT

Turning to the drawings and particularly to FIGS. 1–3, a fragmentary portion of a projection head 10 exemplifying the present invention is shown. The projection head fragment 10 includes a bulkhead 11 which forms an internal partition within a conventional projection head housing (not shown). Mounted on the bulkhead 11 are three pairs of driven sprockets 12, 13 and 14 for moving film 15 continuously through the projection head 10 and intermittently through a light gate 16. Light from an external light source 17 is directed towards an aperture 18 in the light gate 16. The light gate aperture 18 has a predetermined internal dimension for framing the projected picture. The film 15 is pulled at a constant speed from a suitable film supply reel or coil (not shown) through the pair of sprockets 12 to a loop 19. One sprocket 13a of the pair of sprockets 13 is periodically rotated through a predetermined increment for pulling the film 15 from the loop 19 through the light gate 16 one frame at a time. From the pair of sprockets 13, the film passes through a loop 20 and through the pair of sprockets 14 which are driven at a constant speed to a conventional film take-up reel or coil (not shown). The pairs of sprockets 12 and 14 are driven at a constant speed equal to the average speed of the intermittently driven sprockets 13 such that over a period of time the size of the loops 19 and 20 remain substantially constant. The pairs of sprockets 12 and 14 may be driven from a constant speed motor such as the motor 21 which also drives a shutter 22. The drive connections between the motor 21 and the pairs of sprockets 12 and 14 are of a conventional design and, for simplicity, are not shown in the drawings.

The shutter 22 consists of one or more opaque areas 23 (two shown) separated by transparent areas 24. The shutters 22 may consist of a transparent disc having an opaque foil or coating attached thereto to form the opaque areas 23, or it may consist of a blade forming the opaque areas 23 with openings forming the transparent areas 24. The shutter 22 is mounted on a shaft on the motor 21 and is rotated to periodically interrupt the projected picture. In the exemplary embodiment shown in FIGS. 1–3, the shutter 22 is positioned between the light gate 16 and a conventional projection lens system 25 (shown as dashed lines in FIG. 3 only). Or, the shutter 22 may be positioned between the light source 17 and the light gate 16. This arrangement may be preferable since radiant heat energy to the film 15 will be interrupted whenever the projected picture is interrupted by the shutter. However, for the sake of simplicity, the shutter 22 is shown only in a position to the front of the light gate 16. The motor 21 drives the shutter 22 at a constant speed such that the projected picture is interrupted each time the film 15 is to be advanced through the light gate 16. If, for example, the film 15 is advanced at a rate of 24 frames per second, then the shutter 22 is rotated at a rate of 12 revolutions per second or 720 revolutions per minute since the shutter 22 has two opaque areas 23.

Each time the shutter 22 moves to a position where an opaque area 23 interrupts the projected picture, a servomotor 26 is driven to rotate the sprocket 13a to pull the film 15 through the light gate 16 until the next frame on the film 15 is aligned with the light gate aperture 18. The servomotor 26 is of a type having a very low inertia armature, such as a moving coil or shell type, to permit rapid acceleration and deceleration each time the film 15 is advanced through the light gate 16. The servomotor 26 includes an integral internal tachometer for generating a voltage proportional to the speed at which the sprocket 13a is rotated. In addition, an optical encoder 27 is attached to the end of the armature opposite the end attached to the sprocket 13a. As the armature is rotated, an internal mask or slotted disc (not shown) attached to the armature is rotated within the optical encoder 27 to pulse a photodetector. Pulses from the optical encoder 27 indicate the position of the armature within the servomotor 26, and hence the position of the driven sprocket 13a at any given instant. Servomotors which include tachometer and position pulse outputs, as described above, are commercially available.

The servomotor 26 is operated in response to the position of the shutter 22. A suitable detector 28 is mounted on a bracket 29 for sensing the opaque areas 23 of the shutter 22. The detector 28 may take any suitable form for generating a signal when the projected picture is momentarily interrupted by the shutter 22. For example, the detector 28 may consist of a light source and a photodetector mounted on opposite sides of the path through which the opaque areas 23 are rotated. When the shutter 22 is rotated to a position wherein the projected picture is interrupted, the opaque area 23 interrupts light to the photodetector to generate a signal which starts the servomotor 26. However, it may be necessary to carefully shield the photodetector to prevent light from the projector light source 17 from affecting the photodetector. In an alternate form, the opaque area 23 is formed from an electrically conductive material, such as aluminum foil or a steel shutter blade, and the detector 28 is a proximity switch or a capacitive swich which is triggered in response to the close proximity of the opaque area 23. A signal from the detector 28 triggers a control circuit which applies power to the servomotor 26 for advancing the film 15. After the film 15 is advanced and the next frame is aligned with the light gate aperture 18, the servomotor 26 is operated in a position control circuit for actively preventing rotation of the sprocket 13a and therefore for inhibiting any movement of the film 15 within the light gate 16. This is an improvement over prior art systems where, for example, tension of the film in the loops 19 and 20 could pull the film frame out of alignment with the light gate aperture 18 sufficiently to cause flicker or jitter in the projected picture.

Turning now to FIG. 4, details are shown for a control circuit 35 which drives the servomotor 26 to incrementally advance the film 15 in synchronism with the shutter 22. The servomotor 26 is driven in a velocity controlled servo system until a final stopping position is reached wherein a film frame is aligned with the aperture 18 in the light gate 16. At this time, the control circuit 35 switches to a position controlled servo system for preventing movement of the film 15 in the light gate 16.

While the servomotor 26 is operated as a velocity controlled servo system for advancing the film 15 to the next frame, a command signal is applied to the servomotor 26 from a waveform generator 36. The waveform generator 36 comprises a counter 37, a digital memory 38 and a digital-to-analog converter 39. The desired waveform for incrementing the servomotor 26 is digitized and stored in sequential address positions in the memory 38, which may comprise an integrated circuit read only memory (ROM). As the counter 37 is counted up from an initial cleared or zero count, the advancing count forms sequential address data which is applied to the memory 38 for reading the digitized waveform data from the memory 38. The output of the memory 38 is applied to a digital input to the digital-to-analog converter 39. The converter 39 converts the digital waveform data from the memory 38 to an analog waveform which is used as a velocity command signal for driving the servomotor 26. By presetting the counter 37, framing adjustments may be made without mechanically moving the shutter position detector 28.

As previously indicated, the servomotor 26 is driven to pull the film 15 through the light gate 16 by one-frame increments each time the shutter 22 moves to a position interrupting the projected picture. The shutter position detector 28 is used for generating a signal to start the servomotor 26. The shutter position detector 28 generates a pulse which is applied through an OR gate 40 to trigger a monostable or one shot multivibrator 41. The output from the shutter position detector 28 is also connected through an OR gate 42 for clearing the address counter 37 in the waveform generator 36. Thus, the counter 37 is initially set to zero as soon as the shutter 22 moves to the detected position. When triggered, the multivibrator 41 generates an output pulse which counts up the cleared counter 37 to one, or to a number which addresses the first waveform data position in the memory 38. After the counter 37 is counted up, the multivibrator 41 returns to its normal position and the output from the multivibrator 41 is applied through an inverter 43 for triggering the digital-to-analog converter 39. The converter 39 then converts the output from the memory 38 to an analog command voltage for driving the servomotor 26. Each successive clock pulse which triggers the multivibrator 41 increments by one the counter 37 to the next address location in the memory 38 for supplying new data to the converter 39 and, when the multivibrator 41 returns to its stable state, the converter 39 is triggered to generate a new analog output.

The output from the converter 39 is applied sequentially through a summing junction 44, a summing junction 45 and a power amplifier 46 to the servomotor 26. Initially, the output from the converter 39 passes unchanged through the summing junction 44 to the summing junction 45 wherein it is combined with a velocity feedback signal for generating a velocity error signal which drives the servomotor 26. As previously indicated, a tachometer 47 is formed integrally with the servomotor 26 for generating a DC voltage which is proportional to the speed of the servomotor 26. Ideally, the tachometer 47 will generate a pure DC voltage which linearly varies with speed. However, practical tachometers are generally nonlinear and also includes a ripple component in the output voltage. Therefore, the output from the tachometer 47 is connected through a velocity compensation circuit 48 to the summing junction 45. The velocity compensation circuit 48 is of conventional design for linearizing and removing ripple from the output of the tachometer 47, as well as for stabilizing the closed velocity loop. The output of the summing junction 45 forms an error signal which corresponds to the difference between the command signal from the summing junction 44 and the compensated tachometer output. This error signal is amplified for driving the servomotor 26. The summing junction 45 may consist of a conventional differential amplifier which generates an output signal corresponding to the difference between two input signals, namely, to the difference between the compensated output from the tachometer 47 and the output from the waveform generator 36.

As indicated above, the optical encoder 27 is mounted on one end of the shaft of the servomotor 26. The encoder 27 generates a pulse for each predetermined small increment through which the shaft of the servomotor 26 is rotated. If, for example, the encoder 27 has an encoding disc with 720 lines around its periphery, then 720 pulses will be generated for each complete revolution of the shaft of the servomotor 26. Or, in other words, a pulse will be generated for each one-half degree of rotation of the shaft of the servomotor 26. Of course, it will be appreciated that, subject to space limitations, any number of lines may be inscribed on the encoding disc of the encoder 27 for generating any desired number of pulses for each revolution of the servomotor shaft. Increasing the number of pulses generated per revolution of the motor increases the position accuracy to which the servomotor shaft is stopped.

Once cycling of the servomotor control circuit 35 is initiated by a pulse from the shutter position detector 28, the counter 37 in the waveform generator 36 is counted up by pulses generated by the optical encoder 27 as the shaft of the servomotor 26 rotates. Each output pulse from the encoder 27 is applied to a pulse generator 49. The generator 49 in turn generates uniform pulses which pass through the OR gate 40 to trigger the monostable multivibrator 41. When triggered, the multivibrator 41 increments the counter 37 to the next address. As the shaft of the servomotor 26 rotates and the counter 37 is incremented, the desired velocity waveform is read from the memory 38 and generated by the converter 39 and is applied through the junction 44 to the summing junction 45. At the same time, the tachometer 47 generates an analog signal corresponding to the actual velocity of the servomotor 26. This velocity signal is combined at the junction 45 with the output from the waveform generator 36 to form an error signal for driving the servomotor 26.

The position of the shaft of the servomotor 26 is monitored by a final position detector 50 which includes a preset increment register 51, an increment counter 52 and a comparator 53. As previously indicated, the sprocket 13a attached to the shaft of the servomotor 26 is rotated periodically through a predetermined increment for advancing the film 15 to the next frame. If, for example, the sprocket 13a is to be rotated 90° for advancing the film 15 by one frame and the optical encoder 27 generates 720 pulses in one revolution of the shaft of the servomotor 26, then the optical encoder 27 will generate 180 pulses each time the film 15 is advanced to the next frame. When the shutter position detector 28 generates a pulse for starting the servomotor 26, the increment counter 52 is also cleared by the output from the shutter position detector 28. As previously indicated, this pulse and output pulses from the optical encoder 27 also trigger the monostable multivibrator 41 for incrementing the counter 37 in the waveform generator 36. When the monostable multivibrator 41 returns to its steady state, the inverter 43 generates an output which triggers or starts the digital-to-analog converter 39. This output from the inverter 43 is also used for incrementing the counter 52. Thus, as the shaft of the servomotor 26 rotates, the increment counter 52 will be incremented for each one-half degree rotation of such shaft. If 180 pulses are generated by the encoder 27 for each increment through which the film 15 is advanced, then the increment register 51 is preset to the number 180. The comparator 53 continuously compares the output from the increment counter 52 with the contents of the preset increment register 51. When the film 15 has been advanced to the next frame, the comparator 53 generates an output which closes a final position switch 54. When the switch 54 is closed, the servomotor control circuit becomes a position controlled servo system instead of a velocity controlled servo system. Closing the switch 54 connects the pulse output from the optical encoder 27 through a position compensation circuit 55 and the switch 54 to the summing junction 44. Pulses applied to the summing junction 44 will have a polarity depending upon the direction in which forces, such as film tension, attempt to move the shaft of the servomotor 26. The pulse applied to the summing junction 44 is of a polarity to drive the shaft of the servomotor 26 in a direction opposing the forces. In addition, these pulses are at a maximum magnitude for applying a maximum magnitude error signal to the servomotor 26. As a consequence, the servomotor 26 will tend to oscillate between two position marks on the optical encoder 27. However, such oscillations will be of a very small magnitude, such as one-half degree of shaft rotation or less, depending upon the number of position marks on the optical encoder 27. The oscillations will be of a relatively high frequency and a sufficiently small magnitude that the film 15 will for all apparent purposes be held in a fixed position in the light gate 16.

Once the servomotor 26 is stopped and switched into a position controlled servo circuit, it will remain in this state until restarted to advance the film to the next frame. The shutter now moves to a position which permits the picture from the film frame aligned in the light gate aperture 18 to be projected onto a screen. After a predetermined time interval, the shutter 22 will rotate to a position wherein the projected picture is again inhibited. At this time, the shutter position detector 28 generates a new pulse for clearing the address counter 37 in the waveform generator 36 and for triggering the monostable multivibrator 41. This pulse also clears the increment counter 52 in the final position detector 50 and resets or turns off the final position switch 54. The servomotor control circuit 35 will then recycle to advance the film 15 to the next frame.

Starting, stopping and rewinding of film through the projection head 10 is controlled by a projector control circuit 56. The projector control 56 includes suitable switches for starting the constant speed motor 21 which drives the shutter 22 and for energizing the light source 17 when a motion picture film is to be shown. The projector control circuit 56 also includes suitable switches under the control of a pickoff device which senses a conductive mark on the film 15 for dousing the light source 17 and stopping the motors 21 and 26 at the end of the film and, simultaneously, for starting another projector for showing the next film or next film segment. Such a control circuit is shown, for example, in U.S. Pat. No. 3,640,611 which issued to Boudouris et al. on Feb. 8, 1972. When a mark is sensed at the end of the film 15, the control circuit 56 also may be readily adapted to apply a constant signal through the OR gate 42 for holding the address counter 37 clear in the waveform generator 36 and also for operating a rewind switch 57. At this time, the rewind switch 57 applies a constant voltage to the summing junction 44 for driving the servomotor 26 in a reverse direction. The constant voltage applied by the rewind switch 57 to the summing junction 44 may be of a magnitude to operate the servomotor 26 and hence to drive the sprocket 13a continuously at a higher than normal speed in a reverse direction for pushing the film back through the light gate 16. At the same time, film is pulled from the take-up reel by the sprockets 14 and is supplied to the supply reel from the sprockets 12 for rewinding the film. When the film is completely rewound except for a leader, another mark on the film is detected for causing the projector control circuit 56 to release the rewind switch 57 and stop the servomotor 26. At this time, the projector head 10 will remain in an off position until the second projector completes the film currently being projected. The projector control circuit 56 may then restart the projection head 10 for reshowing the picture which has just been rewound. Preferably, the film supply and take-up reels are driven by independent motors. The motors which drive these reels are operated by sensors which detect the tension in or the size of a loop of film between the projection head 10 and the associated reel. If, for example, the sprocket 12 is driven in a direction for pulling film from the supply reel, then the supply reel will be driven at the necessary speed for supplying the needed film. Or, if during rewinding, the sprockets 12 are driven to feed film back to the supply reel, the supply reel will be driven in reverse at the necessary speed for collecting the film at the rate at which it passes from the sprockets 12.

Although not shown, it will be appreciated that a constant voltage signal may be applied through one of the summing junctions 44 or 45 at a polarity for driving the servomotor 26 at a constant forward direction. When such a signal is applied to a junction 44 or 45, the film will be advanced through the projector at a constant speed. This may be desirable for cuing the film.

Turning now to FIG. 5, a graph is shown for comparing different voltages appearing in the servomotor control circuit 35 as well as showing the position of the intermittently driven sprocket 13a. The first graph shows an analog output 65 from the digital-to-analog converter 39 of the waveform generator 36. The converter output 65 will remain at zero volts until the shutter position detector 28 senses at time $t_1$ that the projected picture is interrupted. At this time, the waveform generator 36 generates an output having a peak level 66 which is applied through the summing junction 44 to the summing junction 45. Since the servomotor 26 is not moving at this time, the error voltage 67 which drives the servomotor 26 will have a peak value 68 at time $t_1$. The output from the waveform generator 36 will remain at the constant peak level 66 for a predetermined time interval while the servomotor 26 accelerates. As the servomotor 26 accelerates, an increasing voltage will be applied from the tachometer 47 and velocity compensation circuit 48 to the summing junction 45. Since the tachometer voltage is increasing as the servomotor 26 accelerates, the error voltage 67 will decrease over a period of time. At time $t_2$, the servomotor 26 has accelerated to a desired maximum velocity. From time $t_2$ to a time $t_3$, the waveform generator 36 applies a lower value constant output 69 through the summing junction 44 to the summing junction 45. The difference between this voltage and the velocity signal from the tachometer 47, which is a constant error voltage 70, is applied to the servomotor 26 for driving the servomotor 26 at a constant velocity. From time $t_3$ to a time $t_4$, the servomotor 26 is decelerated to a velocity of zero. This is accomplished by generating a negative signal 71 for the converter output 65 and summing this voltage with the output from the tachometer 47 in the summing junction 45. Initially at time $t_3$ there will be a peak negative error voltage 72 applied to the servomotor 26. As the motor 26 is decelerated, the applied error voltage decreases to zero at time $t_4$. At time $t_4$, the waveform generator 36 generates an output 65 of zero volts. Throughout the time increment from $t_1$ to $t_4$ in which the servomotor 26 has been accelerated, driven at a constant speed, and then decelerated, the velocity of the shaft of the servomotor 26 and of the attached sprocket 13a will take on a trapezoidal shape as shown by the graph line 73. When the velocity becomes zero at time $t_4$, a film frame is aligned in the light gate aperture 18.

After the servomotor 26 is stopped at time $t_4$, the output 65 from the waveform generator 36 remains zero until the film is to be advanced to the next frame and the servomotor 26 is operated as a position control servo system. As the shaft of the servomotor 26 tends to move off the stopped position after time $t_4$, the optical encoder 27 applies either positive pulses 74 or negative pulses 75 through the closed final position switch 54 and the summing junctions 44 and 45 to the servomotor 26 for driving the servomotor 26 to the desired stopped position. The servomotor 26 never moves from the stopped position a distance greater than the distance between two lines on the optical encoder 27. This distance is selected to be sufficiently small that noticeable movement of the film 15 does not occur. Each positive pulse 74 will cause a short acceleration force on the sprocket 13a in a direction to advance the film through the light gate 16 and each negative pulse 75 will apply a high acceleration force for a short time in a negative direction to push the film 15 back in the light gate 16.

The position of the driven sprocket 13a is shown graphically by the line 76. Initially, the sprocket 13a will be assumed to have a position of zero degrees, or a reference position. As the motor velocity accelerates from this position, the sprocket 13a will be rotated from time $t_1$ to time $t_2$ by an increasing amount along a parabolic line 77. The servomotor 26 then has a constant velocity for a predetermined time increment through which the sprocket 13a is rotated linearly through an increment from time $t_2$ to time $t_3$, as designated by the graph line 78. The sprocket 13a then continues to be rotated from time $t_3$ to time $t_4$ through a parabolic curve 79 which is asymptotic with 90° of rotation, the exemplary increment through which the sprocket 13a is advanced. The sprocket 13a will then oscillate about the 90° mark as positive and negative error voltage pulses 74 and 75 are applied to the servomotor 26. However, the actual motion is very small, as previously indicated, even though the error voltage pulses 74 and 75 are at a high voltage level for rapidly correcting errors. The actual voltage level of the error pulses 74 and 75 is preferably selected to be as high as possible without exceeding the rating of the servomotor 26 and without producing objectionable noise from the servomotor 26 as it oscillates about the stopped position.

It will be appreciated that various modifications and changes may be made in the above-described projection head 10 without departing from the spirit and scope of the claimed invention. For example, the exemplary trapezoidal velocity waveform 73 shown in FIG. 5 may be modified to other shapes such as parabolic or half a sine wave merely by changing the output 65 from the waveform generator 36. In addition, other known types of waveform generators may be substituted for the generator 36 and other known hybred servomotor velocity and position control circuits may be substituted for the exemplary control circuit 35 of FIG. 4. Furthermore, the shutter position detector 28 may take various forms such as an optical light source and photodetector, a proximity switch, a capacitive switch, a magnetic switch, etc. Various other modifications and changes will also be apparent to those skilled in this art.

What I claim is:

1. A motion picture projector having a gate through which film is incrementally advanced and having a shutter which is rotated for periodically blocking the projected picture to allow the film to be advanced through said gate, an improved transport for advancing the film through such gate comprising, in combination, sprocket means positioned for moving the film through said gate, an electric motor connected to rotate said sprocket, means for generating a first signal after said shutter is rotated to a predetermined position completely blocking the projected picture, means responsive to said first signal for generating a motor control signal, and means responsive to said motor control signal for driving said motor, said motor control signal causing said motor to rotate said sprocket means through a predetermined rotational increment for advancing said film through said gate by one picture frame.

2. In a motion picture projector, an improved transport, as set forth in claim 1, wherein said motor is a servomotor, and including means for applying high magnitude drive signals to said servomotor while said film is stationary and a picture is projected, said drive signals having a polarity for driving said servomotor to rotate said sprocket to a predetermined position with a film frame aligned with said gate for clamping said sprocket means in such predetermined position.

3. In a motion picture projector, an improved transport, as set forth in claim 2, and further including means for driving said motor continuously in a predetermined direction to cause said sprocket means to move the film continuously through said gate.

4. In a motion picture projector, an improved transport, as set forth in claim 2, and further including means for driving said motor continuously in a predetermined direction to cause said sprocket means to move the film continuously through said gate.

5. In a motion picture projector having a gate through which film is incrementally advanced one frame at a time, an improved film transport comprising, in combination, shutter means for periodically interrupting the projected picture, means for driving said shutter means at a predetermined speed for interrupting the projected picture each time the film is to be advanced through said gate, means for detecting when said shutter has been driven to a predetermined position blocking the projected picture, and means responsive to said detecting means detecting said shutter in the predetermined position for electrically advancing the film through said gate while said shutter interrupts the projected picture, said advancing means including a sprocket which engages the film, a servomotor connected to rotate said sprocket, means for applying to said servomotor a voltage varying in average magnitude from a minimum value to a maximum value and back to a minimum value for advancing the film through said gate by one frame, and means for applying error pulses having substantially said maximum voltage value to said servomotor for rotating said sprocket to a predetermined position wherein a film frame is aligned with said gate for clamping said sprocket in such predetermined position.

6. In a motion picture projector, an improved film transport, as set forth in claim 5, and further including means for driving said motor continuously in a predetermined direction to cause said sprocket means to move the film continuously through said gate.

7. In a motion picture projector having a gate through which film is incrementally advanced one frame at a time, an improved film transport comprising, in combination, shutter means for interrupting the projected picture, means for driving said shutter means at a predetermined speed for interrupting the projected picture each time the film is to be advanced through said gate, and means for electrically advancing the film through said gate while said shutter interrupts the projected picture, said advancing means including a sprocket which engages the film, a servomotor connected to rotate said sprocket, means for applying to said servomotor a voltage varying in average magnitude from a minimum value to a maximum value and back to said minimum value for advancing the film a predetermined distance through said gate, and means for applying error pulses having substantially said maximum voltage to said servomotor for rotating said sprocket to a predetermined position wherein a film frame is aligned with said gate for clamping said sprocket in such predetermined position.

* * * * *